United States Patent [19]

Richardson

[11] Patent Number: 4,633,526

[45] Date of Patent: Jan. 6, 1987

[54] IMMERSION SUITS

[75] Inventor: Graham Richardson, Fleet, England

[73] Assignee: The Secretary of State for Defence in Her Britannic Majesty's Government of the United Kingdom of Great Britain and Northern Ireland, London, England

[21] Appl. No.: 785,671

[22] Filed: Oct. 9, 1985

[30] Foreign Application Priority Data

Oct. 18, 1984 [GB] United Kingdom ................. 8426368

[51] Int. Cl.⁴ ............................................. A62B 17/00
[52] U.S. Cl. .................................... 2/2.1 R; 2/2.1 A; 2/DIG. 1
[58] Field of Search .......... 2/2, 2.1 R, 2.1 A, DIG. 1; 137/461

[56] References Cited

U.S. PATENT DOCUMENTS

| 542,024 | 7/1895 | Mc Ilhenny | 137/461 |
|---|---|---|---|
| 2,404,020 | 7/1946 | Akerman | 2/2.1 A |
| 2,741,451 | 4/1956 | Welborn et al. | 137/461 X |
| 2,989,752 | 6/1961 | Sloane et al. | 2/2.1 R |
| 3,042,926 | 7/1962 | Shepard | 2/2.1 R |
| 3,925,839 | 12/1975 | Smith | 2/2.1 R |
| 4,023,223 | 5/1977 | Anderson et al. | 2/2.1 A |
| 4,455,683 | 6/1984 | Moretti | 2/DIG. 1 |
| 4,494,246 | 1/1985 | Tillbrook | 2/2.1 R |
| 4,547,904 | 10/1985 | Long et al. | 2/2.1 R |

FOREIGN PATENT DOCUMENTS 1058232 2/1967 United Kingdom .

Primary Examiner—Louis K. Rimrodt
Attorney, Agent, or Firm—William R. Hinds

[57] ABSTRACT

The invention provides a ventilated immersion suit for aircrew and includes a waterproof overall (1), an air vent (8) in the upper region of the overall, a shut-off valve (19) for closing the air vent, and means (16) responsive to hydrostatic pressured in a tube 5 which is generated by immersion in water so as to operate the shut-off valve and thereby close the air vent.

2 Claims, 3 Drawing Figures

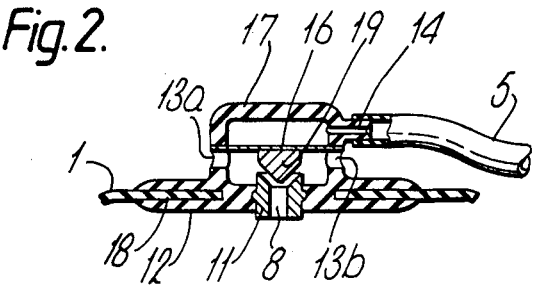
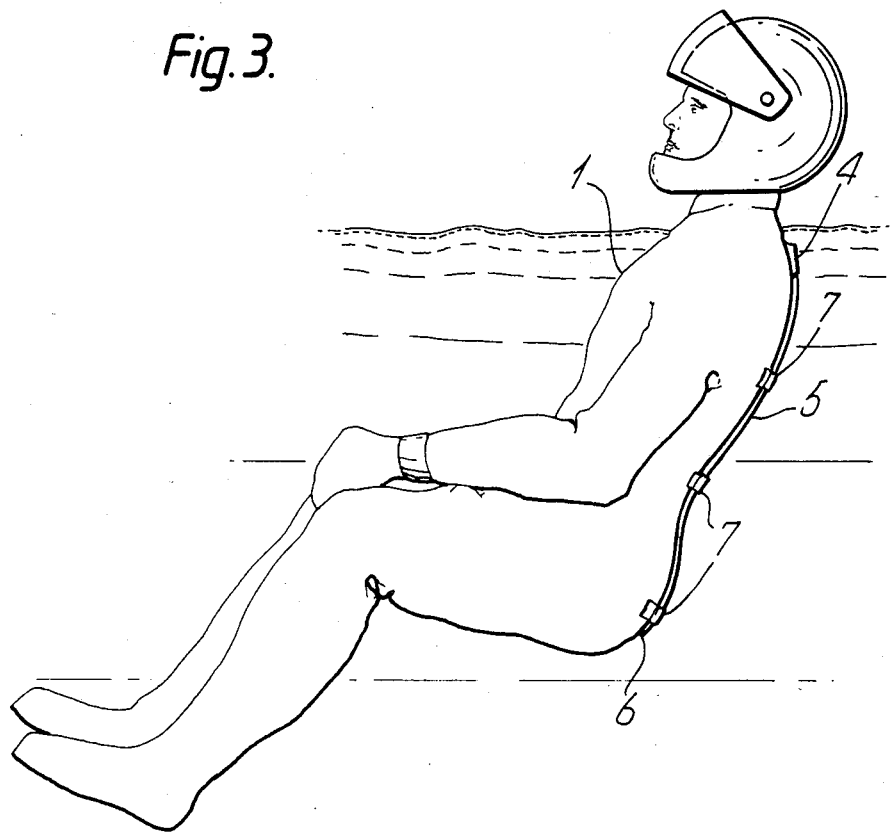

IMMERSION SUITS

The present invention relates to immersion suits, and is particularly concerned with the ventilation of immersion suits.

An immersion suit is a protective suit which, for example, is sealed at the wearer's neck and wrists and which insulates the wearer when floating in cold water and increases his chances of survival.

Early immersion suits for aircrew were composed of impermeable material and were sealed at the neck and wrists so that when a decrease in cockpit pressure was experienced on aircraft ascent the air in the suit expanded causing discomfort to the wearer. A one-way valve was added to such suits to overcome the problem of expansion but it was found that when the cockpit or ambient pressure increased on descent there was insufficient air in the suit to provide satisfactory insulation when immersed in cold water.

A two-way air vent valve would allow water into the suit on immersion, thus destroying its insulation properties. The present invention provides a fully ventilated, waterproof, immersion suit.

According to the present invention an immersion suit for aircrew includes a waterproof overall, a chamber mounted in the upper region of said overall and comprising first and second compartments, said first compartment carrying a valve body and providing a free passage of air through the valve body between the interior of the suit and the surroundings, a flexible diaphragm separating said first and second compartments and a valve head mounted on the diaphragm whereby excess pressure in said second compartment distorts the diaphragm and causes said valve head to mate with said valve body thereby preventing fluid flow into the suit interior through the valve body, and means for creating excess pressure in said second compartment when the wearer of said suit is immersed in water.

The means for creating excess pressure in the second compartment comprises a flexible tube extending from the second compartment and having an open end located at the lower torso region of the overall, the flexible tube constituting the only passage between the second compartment and the surroundings whereby on immersion of the suit, water enters the flexible tube at its open end and raises the pressure in the second compartment above that in the first compartment.

An embodiment of the invention will now be described, by way of example only, with reference to the drawings of which:

FIG. 2 is a sectional side elevation of a valve assembly of the suit of FIG. 1.

FIG. 3 shows the suit of FIG. 1 worn by aircrew floating in water.

Figure 1:
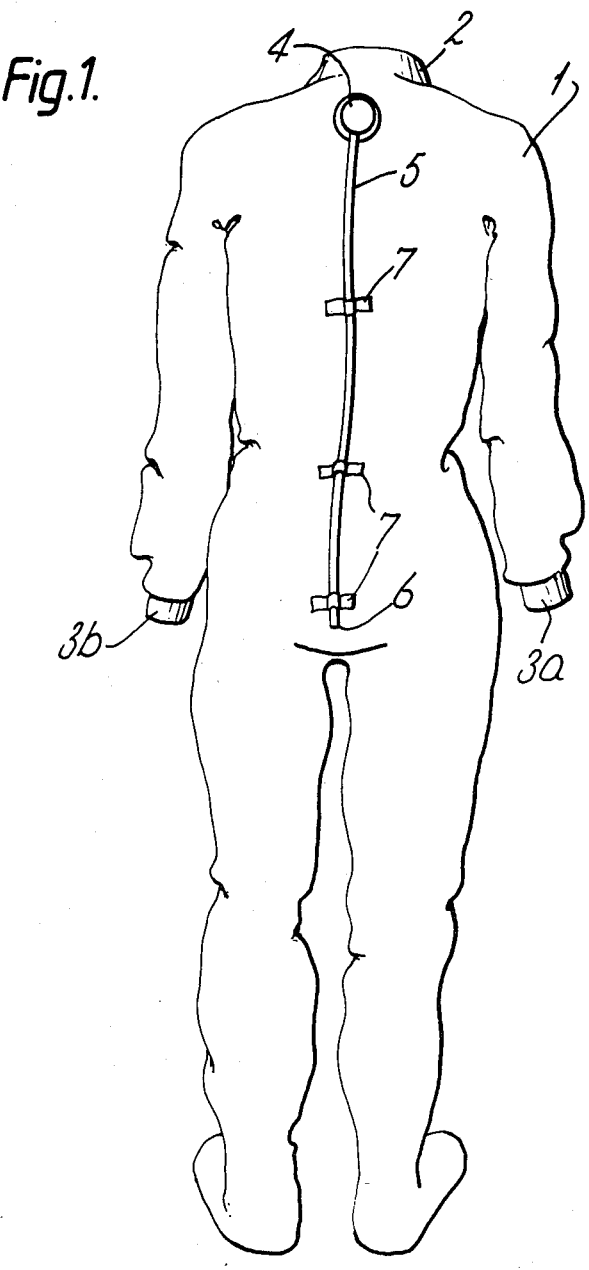
FIG. 1 is an immersion suit in accordance with the invention.

FIG. 1 shows a rear view of an immersion suit for protecting aircrew when immersed in cold water. The suit comprises an overall which is composed of rubberised fabric has a neck seal 2 and wrist seals 3a, 3b of conventional design. A valve assembly 4 in the neck region serves to ventilate the overall over a range of ambient air pressures. Part of the interior of the valve assembly 4 is connected to an inlet 6 by means of a tube 5. The inlet is situated near the lumbar region of the overall and the tube is held in place on the overall by means of tapes 7 bonded to the surface of the overall.

FIG. 2 shows the valve assembly of the suit. The assembly includes a lower casing 12 and an upper casing 17, bonded together, and each being composed of hard rubber. An annular portion of the overall fits into a groove 18 in the lower casing and is bonded to the material of the overall therein. The lower casing 12 carries a valve body 11 having a cylindrical bore 8 therein through which air flows into and out of the overall via a pair of holes 13a, 13b, also in the lower casing. A flexible diaphragm 16 extends between the upper and lower casings thus dividing the valve assembly into two compartments and carries a part-conical valve head 19. The tube 5 is connected to an inlet 14 in the upper casing, so that the outer compartment, i.e. that bounded by the upper casing interior and the upper surface of the diaphragm 16 is connected by the tube to ambient air around the suit.

In operation, under normal conditions, the valve remains open as shown in FIG. 2. Assuming the suit is donned at sea-level, any decrease in ambient pressure due to increasing altitude results in air flowing out of the suit via the bore 8 and holes 13a and 13b. A subsequent increase in ambient pressure will cause air to flow into the suit via holes 13a, 13b and bore 8. If the wearer falls or jumps into the sea he will usually float in the position shown in FIG. 3 when wearing a life-jacket (not shown). In this position, water will enter the tube 5 at inlet 6 and reach a level in the tube 5 determined by the attitude of the wearer and the initial pressure of air trapped in the outer compartment. As a result, there is, after immersion, a differential hydrostatic pressure across the diaphragm 16, and valve head 19 is accordingly urged against the opening of bore 8 preventing ingress of water into the suit. It has been found that if quite small amounts of water are allowed to leak into an immersion suit the survival time of the wearer is significantly reduced, owing to more rapid loss of body heat through wet underwear.

I claim:

1. An immersion suit for aircrew, said suit comprising a waterproof overall, a chamber mounted in the upper region of said overall and comprising first and second compartments, said first compartment carrying a valve body and providing a free passage of air through the valve body between the interior of the suit and the surroundings, a flexible diaphragm separating said first and second compartments and a valve head mounted on the diaphragm and matable with, but normally spaced from, the valve body whereby excess pressure in said second compartment distorts the diaphragm and causes said valve head to mate with said valve body thereby preventing fluid flow into the suit interior through the valve body, and means for creating excess pressure in said second compartment when the wearer of said suit is immersed in water.

2. An immersion suit for aircrew as claimed in claim 1 in which the means for creating excess pressure in said second compartment comprises a flexible tube extending from said second compartment and having an open end located at the lower torso region of said overall, said flexible tube constituting the only passage between said second compartment and the surroundings whereby on immersion of the suit, water enters said flexible tube at its open end and raises the pressure in said second compartment above that in said first compartment.

* * * * *